(12) United States Patent
Hartanto

(10) Patent No.: US 6,797,047 B2
(45) Date of Patent: Sep. 28, 2004

(54) HIGH TEMPERATURE RESISTANT MARKING AGENT, ESPECIALLY INK

(75) Inventor: Vincentius Hartanto, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 86 days.

(21) Appl. No.: 10/258,854

(22) PCT Filed: Jun. 6, 2001

(86) PCT No.: PCT/DE01/02127

§ 371 (c)(1),
(2), (4) Date: Oct. 29, 2002

(87) PCT Pub. No.: WO01/96482

PCT Pub. Date: Dec. 20, 2001

(65) Prior Publication Data

US 2003/0101899 A1 Jun. 5, 2003

(30) Foreign Application Priority Data

Jun. 16, 2000 (DE) ......................... 100 29 762

(51) Int. Cl.$^7$ .............................................. C09D 11/00
(52) U.S. Cl. .................... 106/31.05; 106/31.6; 106/31.9
(58) Field of Search ............................ 106/31.05, 31.6, 106/31.9

(56) References Cited

U.S. PATENT DOCUMENTS

| | | | | |
|---|---|---|---|---|
| 4,182,261 A | * | 1/1980 | Smith et al. ................ | 118/31.5 |
| 4,681,638 A | * | 7/1987 | Schiek ........................ | 106/419 |
| 5,443,629 A | | 8/1995 | Saville ..................... | 106/31.17 |
| 5,714,236 A | | 2/1998 | Withington .................. | 106/429 |
| 5,876,581 A | * | 3/1999 | Itaya et al. ................. | 205/316 |

* cited by examiner

Primary Examiner—Helene Klemanski
(74) Attorney, Agent, or Firm—Harness, Dickey & Pierce, P.L.C.

(57) ABSTRACT

A high temperature resistant marking agent includes a small number of inexpensive pro-analysis chemicals. The chemicals are dissolved into precise mass parts in distilled water and can be applied, for example, using of a stamp, a paint brush or a fibre tip pen. The marking agent can be used, for example, to mark the bricks of a combustion chamber.

17 Claims, No Drawings

HIGH TEMPERATURE RESISTANT MARKING AGENT, ESPECIALLY INK

This application is the national phase under 35 U.S.C. §371 of PCT International Application No. PCT/DE01/02127 which has an International filing date of Jun. 6, 2001, which designated the United States of America and which claims priority on German Patent Application number DE 100 29 762.5 filed Jun. 16, 2000, the entire contents of which are hereby incorporated herein by reference.

FIELD OF THE INVENTION

The invention generally relates to a high temperature resistant marking agent, especially ink, for application to a surface, especially a ceramic surface.

BACKGROUND OF THE INVENTION

Such an ink is known, for example, from U.S. patent specification 5,055,137. The known ink is used for the marking of bodies. The high temperature resistant ink can be applied to cold or hot surfaces. To achieve the high temperature resistance, a mixture of a large number of different oxides which each have a certain molecular mass is used. In addition, various additives such as graphite, metals, sulfides etc. are used as stabilizers.

SUMMARY OF THE INVENTION

An object of an embodiment of the present invention is to produce a high temperature resistant marking agent from a smaller number of less expensive chemicals.

An object may be achieved for a high temperature resistant marking agent according to an embodiment of the invention by the marking agent comprising
  17–20 parts by mass of iron(III) nitrate nanohydrate,
  14–15 parts by mass of potassium hexacyanoferrate(H) trihydrate,
  2.5–10 parts by mass of 25% strength ammonia solution and
  160–200 parts by mass of distilled water.

The chemicals used are inexpensive proanalysis chemicals and distilled water. These substances can be acquired in a cost-effective manner and are available in an adequate amount. The high temperature resistant marking agent does not comprise any high temperature corrosive constituents. After subjecting the marking agent to a temperature of more than 500° C., virtually only iron oxides are still present.

The markings produced with the new type of marking agent are readily legible both prior to being subjected to heat and also after being subjected to heat. The marking withstands are subjected to temperatures of up to 1500° C. Prior to being subjected to heat, the marking agent has a blue color. After being subjected to heat of about 500° C., the color changes to a brown shade. The marking agent can be produced under atmospheric conditions by the portion-wise addition and mixing of the individual chemicals with the distilled water.

DETAILED DESCRIPTION OF THE PREFERRED EMBODIMENTS

The invention is described in more detail below by reference to a working example.

The potassium hexacyanoferrate(II) trihydrate $\{K_4[Fe(CN)_6]3H_2O\}$ is dissolved in a predetermined amount of distilled water $\{H_2O\}$. Gentle warming assists the dissolution operation. The iron(III) nitrate nanohydrate $\{Fe(NO_3)_3.9H_2O\}$ is then added in portions to the existing solution and thoroughly mixed. To neutralize the solution, a 25% strength ammonia solution $\{NH_3\}$ is added thereto. The solution is to be neutralized to a pH of 6 to 7. Following a prolonged standing period, settlement of solid constituents of the solution can be observed. For this reason, thorough mixing of the solution is required prior to each use.

In order to produce 100 g of the high temperature resistant marking agent, 188 g of iron(E) nitrate nanohydrate and 147 g of potassium hexacyanoferrate(II) trihydrate are necessary. To achieve a ready-to-use consistency of the finished marking substance, approx. 1600 ml of distilled water are required. For the neutralization, 25 ml of 25% strength ammonia solution are added.

The high temperature resistant marking agent can be applied, for example, by using a suitable stamp, paintbrush or fiber-tip pen to the surface of the body to be marked.

The marking substance can be used, for example, for the permanent marking of combustion chamber bricks present in gas turbines.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A marking agent for application to a surface, comprising:
  17–20 parts by mass of iron(III) nitrate nanohydrate;
  14–15 parts by mass of potassium hexacyanoferrate(II) trihydrate;
  2.5–10 parts by mass of 25% strength ammonia solution; and
  160–200 parts by mass of distilled water.

2. The marking agent of claim 1, wherein the marking agent is an ink.

3. The marking agent of claim 1, wherein the marking agent is for application to a ceramic surface.

4. The marking agent of claim 1, wherein the marking agent is resistant to relatively high temperatures.

5. The marking agent of claim 1, wherein the marking agent is for application to surfaces susceptible to relatively high temperatures.

6. The marking agent of claim 1, wherein the marking agent is for permanent marking of combustion chamber bricks.

7. A combustion chamber brick comprising the marking agent of claim 1.

8. A gas turbine comprising the combustion chamber brick of claim 7.

9. A method of making a marking agent, comprising the steps of:
  dissolving 14–15 parts by mass of potassium hexacyanoferrate(II) trihydrate in 160–200 parts by mass of distilled water to create a solution;
  adding 17–20 parts by mass of iron(III) nitrate nanohydrate to the solution; and
  adding 2.5–10 parts by mass of 25% strength ammonia solution.

10. The method of claim 9, further comprising:
  warming the solution to assist the dissolution.

11. The method of claim 9, further comprising:
  mixing the solution.

12. The method of claim 9, wherein the solution is neutralized to a pH of 6 to 7.

13. The method of claim 9, wherein the method is for making a marking agent that is an ink.

14. The method of claim 9, wherein the method is for making a marking agent that is for application to a ceramic surface.

15. The method of claim 9, wherein the method is for making a marking agent that is resistant to relatively high temperatures.

16. The method of claim 9, wherein the method is for making a marking agent that is for application to surfaces susceptible to relatively high temperatures.

17. The method of claim 9, wherein the method is for making a marking agent that is for permanent marking of combustion chamber bricks.

* * * * *